United States Patent
Remmele et al.

(10) Patent No.: US 6,636,600 B1
(45) Date of Patent: Oct. 21, 2003

(54) METHOD FOR FINDING A CONTACT OR FOR SETTING UP A CONNECTION TO THE CONTACT

(75) Inventors: Werner Remmele, Mering (DE); Gabriele Schmiedel, Warngau (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/566,065

(22) Filed: May 5, 2000

(30) Foreign Application Priority Data

May 5, 1999 (DE) .......................... 199 20 737

(51) Int. Cl.⁷ ............................................. H04M 3/00
(52) U.S. Cl. .............................. 379/265.12; 379/265.13
(58) Field of Search ...................... 379/265.12, 265.13; 707/3, 9, 10

(56) References Cited

U.S. PATENT DOCUMENTS 5,875,242 A * 2/1999 Glaser et al. .......... 379/201.05
6,466,941 B1 * 10/2002 Rowe et al. ................ 707/102

FOREIGN PATENT DOCUMENTS

| DE | 19627472 A1 | 1/1998 |
| DE | 19651788 A1 | 6/1998 |

OTHER PUBLICATIONS

"Einführung in die Agenten–Technology" (introduction to agent technologies), Hans–Dieter Burkhardt, Informationstechnik und Technische Informatic 40, 1998, pp. 6–11.

* cited by examiner

*Primary Examiner*—Ahmad F. Matar
*Assistant Examiner*—Quynh H. Nguyen
(74) *Attorney, Agent, or Firm*—Laurence A. Greenberg; Werner H. Stemer; Ralph E. Locher

(57) ABSTRACT

A method for finding a contact within a first group who is linked to a communications partner in a second group. For this, desired properties of the desired communications partner in the second group are entered into a communication agent, and the communication agent transmits inquiries to communication agents of persons in the first group. Information regarding a contact found in the first group is output via a man/machine interface.

10 Claims, 1 Drawing Sheet

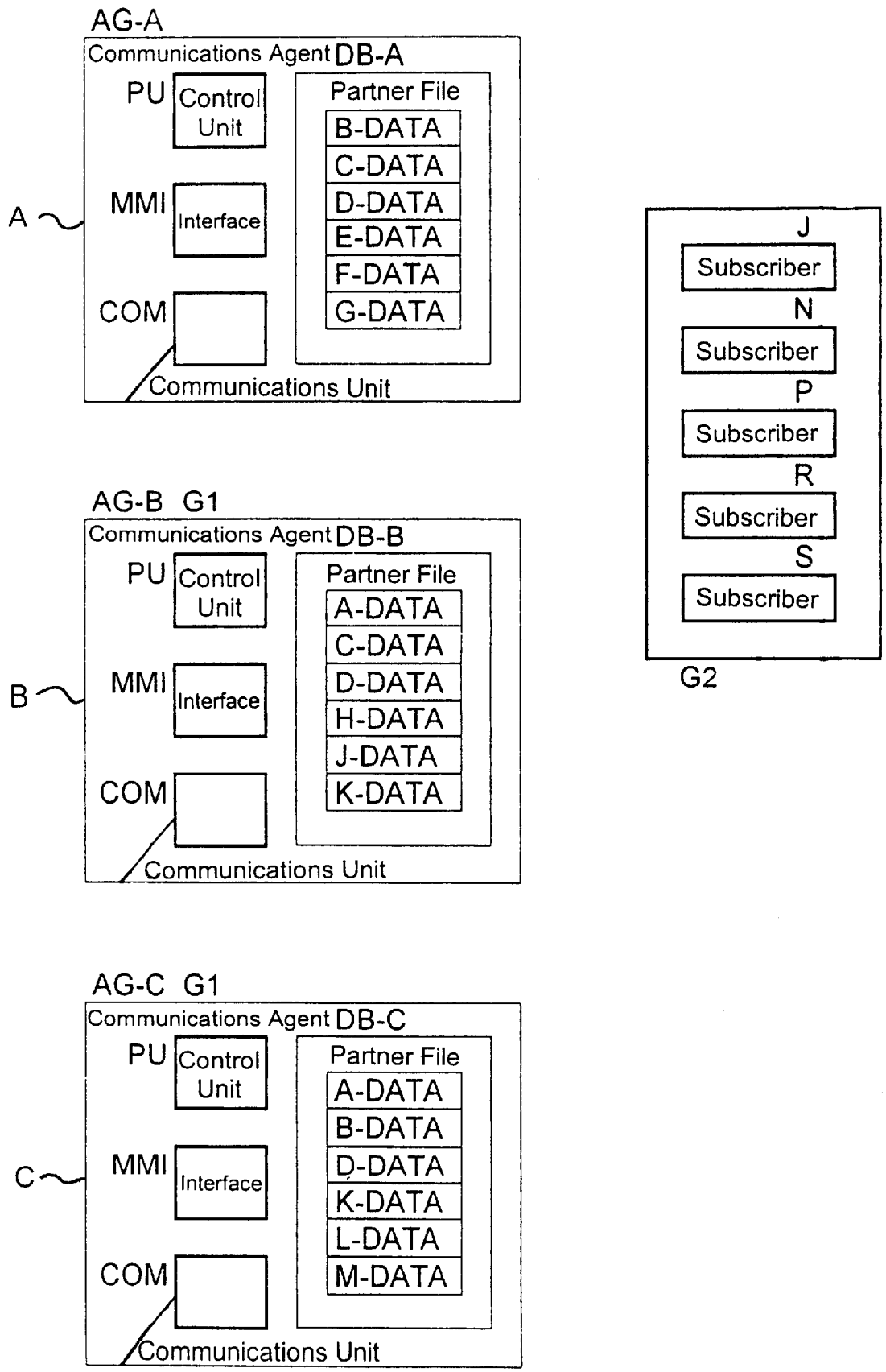

METHOD FOR FINDING A CONTACT OR FOR SETTING UP A CONNECTION TO THE CONTACT

BACKGROUND OF THE INVENTION

Field of the Invention

The invention relates to a method for finding a contact within a first group who is linked to a desired communications partner within a second group, which is defined by desired properties of the communications partner, and to a method for setting up a connection to such a contact.

The invention is concerned with a solution to the problem that a communication subscriber wants a communications partner having particular properties. Such properties may be, for example, special knowledge in a particular area, or else attachment to an organization, to a company, to a particular division of a company, such as sales, or to a particular division of the company of the communication subscriber.

The communication subscriber is usually in a particular associated field, such as his circle of acquaintances, his company, an association or an organization, and can expect with all probability that a person in this associated field is linked to a communications partner having the desired properties.

SUMMARY OF THE INVENTION

It is accordingly an object of the invention to provide a method for finding a contact or for setting up a connection to the contact which overcomes the above-mentioned disadvantages of the prior art methods of this general type. The present invention is concerned with a technical solution to finding such a contact linked to a communications partner having particular properties.

With the foregoing and other objects in view there is provided, in accordance with the invention, a contact finding method, which includes:

providing a first group and a second group;

entering desired properties of a desired communications partner of the second group into a communication agent associated with a searching subscriber;

transmitting inquires specifying the desired properties from the communication agent associated with the searching subscriber to a multiplicity of further communication agents each associated with persons within the first group;

checking a communications partner file of each of the persons in the first group for entries of communications partners in the second group having the desired properties via the further communication agents associated with the persons;

transmitting information regarding a found subscriber in the first group, who has been determined to be a contact and with whom one of the further communication agents is associated, by the further communication agents to the communication agent of the searching subscriber if the desired communications partner having the desired properties is found; and outputting additional information, via the communication agent of the searching subscriber, regarding the contact found in the first group to a man/machine interface.

The basis of the invention is that both the searching subscriber and the persons in the first group each have a communication agent with particular properties. Such a communication agent, that is associated with the particular subscriber, must have the property that it interchanges information with other communication agents. This can usually take place via a communication network or via a data network.

At least the communication agents of the persons in the first group must each have access to a communications partner directory containing communications partners of the subscriber with whom they are associated. In such a communications partner directory, it should be possible to enter not only the basic requirements, such as communication address or telephone number and name of a communications partner, but also further properties.

At least the communication agents associated with the members of the first group require a controller so that, prompted by another communication agent, the entries for at least the additional properties of the communications partners of the person with whom they are respectively associated can be compared with desired properties. In this context, if appropriate, a plurality of properties can be logically combined on the basis of the rules of Boolean algebra, that is to say using AND, OR, AND NOT, etc. In addition, the controller for the communication agents of at least the persons in the first group must be configured so that, if the result of the comparison of the properties is positive, they can transmit a report to the communication agent which gave the order for the comparison procedure. If appropriate, this report can be restricted to the name and/or one or more communication addresses of the person in the first group with whom the communication agent sending the report is associated.

Alternatively, the report can additionally contain information about the communications partner found with the properties sought.

At least the communication agent of the subscriber searching for the contact must contain the controller so that, after the desired properties of a desired communications partner have been entered, inquiries regarding the presence of contact partners having the sought properties in the communication directories of potential contacts can be transmitted to communication agents of these potential contacts. Furthermore, the communication agent of at least the subscriber searching for a contact must contain the controller so that, after a positive acknowledgement has been received from the communication agent of the contact, information regarding the contact found can be output to a man/machine interface.

If, in addition to the information being output, it is also desirable to set up a connection to such a contact, the communication agent of at least the subscriber searching for the contact also requires a controller for setting up such a connection.

With the foregoing and other objects in view there is also provided, in accordance with the invention, a connection set up method, which includes:

providing a first group and a second group;

entering desired properties of a desired communications partner of the second group into a communication agent associated with a searching subscriber;

making a request for the connection to be set up to a contact within the first group;

transmitting inquiries specifying the desired properties, via the communication agent associated with the searching subscriber, to a multiplicity of further communication agents each associated with persons within the first group;

checking, via the further communication agents, a communications partner file of each of the persons in the first group for entries of communications partners in the second group having the desired properties;

transmitting information regarding a found subscriber in the first group who has been found as the contact and with whom one of the further communication agents is associated, by the further communication agents to the communication agent of the searching subscriber if the desired communications partner having the desired properties is found; and using the communication agent of the searching subscriber to output additional information regarding the contact found in the first group and the connection to the contact is set up.

The first group, within which the method according to the invention searches for the contact, can either have a predetermined definition or can be defined, as required, administratively or by a searching subscriber. It is also possible for the first group to be selected from a multiplicity of possible person groups or for it to contain the sum of a plurality of defined person groups. In relation to a searching subscriber, for example, such person groups or the first group are all the communications partners in the company of the searching subscriber or in a particular division of the company, all the persons in an organization to which the subscriber also belongs, the members of a working group, the members of a project group, or persons working in a particular area of activity. If the members of the first group can be defined by the searching subscriber, another provision may be that, to define the first group, members of a plurality of predefined groups are selected on the basis of the rules of Boolean algebra, for example using AND or OR functions. By way of example, the first group can contain all the members of the company of the searching subscriber who are members of a superordinate organization, that is to say that it can be defined by an AND function between the members of the company and the members of the organization. The first group of potential contacts can also be defined by an OR function, for example between all the members of the personal communications partner directory of the searching subscriber and all the members of his company.

The method according to the invention for finding the contact and the method according to the invention for setting up a connection to the contact within the first group whose members are linked to a desired communications partner within a second group, which is defined by the desired properties of the communications partner, have the below list common method steps.

The desired properties of the desired communications partner in the second group, that is to say the definition of the second group, is entered by the searching subscriber into his associated communication agent. The communication agent associated with the searching subscriber transmits inquiries, specifying the desired properties, to a multiplicity of communication agents that are each associated with persons within the first group. The individual communication agents each associated with communications partners in the first group check a respective communications partner file of the person with whom they are associated for entries of communications partners having the desired properties. If such an entry has been found, the communication agent which has found this entry transmits information regarding the person found as the contact, with whom it is associated, to the communication agent of the searching subscriber.

The communication agent of the searching subscriber outputs the information regarding the contact found.

In the method according to the invention for finding a contact, the information regarding the contact found is output to a man/machine interface, for example a display device or an announcement device. In this case, the display device can also be an interactive user interface.

In the method for setting up the connection to the contact within the first group, although it is possible for the information regarding the contact found to be output via such a man/machine interface, it is not absolutely necessary. If appropriate, the information can also be output to a communication control unit setting up a desired connection.

The method for setting up the connection to the contact within the first group who is linked to the desired communications partner within the second group also differs from the method for finding such the contact as a result of the additional method step that the searching subscriber requests that his associated communication agent set up the connection to such a contact.

The described method for finding the contact or for setting up the connection to such a contact allows many potential contacts to be included in the search without troubling these contacts. In the method according to the invention, usually only the one contact with which the searching subscriber actually makes contact becomes aware of a search procedure carried out. Even if a plurality of contacts in the first group are linked to communications partners having the desired properties, normally only a few, optimally only one, of these contacts are contacted. Nevertheless, if appropriate, the selection can be made from a very large number of potential contacts, so that the chance of obtaining a positive search result is very high.

Preferably, for each item of information in each data record in his communications partner file, the subscriber can define whether this item of information can be recognized by communication agents of other subscribers or whether the item of information is intended to be private, and hence not visible from outside. In this context, an entire data record can also be marked as private, and hence as inaccessible. Such data records or information marked as private are not taken into account in a search request by the respective subscriber communication agent and are thus not transmitted to the communication agent associated with the searching subscriber. Each subscriber then defines what information stored by him is available for general search queries, that is to say is accessible to third parties. Such a case has the assurance that search methods according to the invention only yield results ascertained with the consent of the individual persons in the first group.

In one beneficial refinement of the method according to the invention for finding the contact, the communication agent of the searching subscriber outputs information regarding a plurality of contacts found in the first group. In a development of such a method according to the invention for finding the contact, the information regarding the contact found in the first group contains respective information about the type of relationship between this contact and the communications partner having the desired properties. In this or another development of the refinement of the method according to the invention for finding the contact, the information regarding the contacts found in the first group contains respective information about the communications partners in the second group to whom the contact is linked.

The information regarding the contacts found can, of course, also be transmitted if the communication agent of the searching subscriber outputs only information regarding one contact found in the first group. However, if the communication agent of the searching subscriber outputs information regarding a plurality of contacts found in the first group, the information about the type of relationship between the contact and the communications partner in the second group or the information about the communications partner in the second group makes it easier for the searching subscriber to select a preferred contact in the first group.

The type of relationship between the contact and the communications partner in the second group can, by way of example, be attachment to a common organization, attachment to a common working group, a purchaser/vendor or vendor/purchaser relationship or a service-provider/customer relationship.

By way of example, the additional information about the communications partner in the second group can contain information about attachment to an organization, can contain hierarchical information, can contain information about the function of the communications partner found within an organization, a company or a company department, or information about different possibilities for communication with the communications partner found.

In one beneficial refinement of the method according to the invention for setting up the connection to the contact, information regarding the contact found in the first group is output by the communication agent of the searching subscriber using graphic characters on a display unit. In this context, the display unit can also be part of an interactive user interface. In all cases, an input device for entering a confirmation report is necessary in the refinement of a method for setting up a connection. In this context, the embodiment of the method according to the invention for setting up a connection to the contact provides that, after the information regarding the contact found in the first group has been output using graphic characters on a display unit, the connection is set up only after confirmation has been entered by the subscriber.

The refinement of the method according to the invention enables the subscriber optionally to prevent the connection from being set up or to define the instant for setting up the connection himself after he has evaluated the display information about the contact.

In one development of the described refinement of the method according to the invention for setting up the connection, the communication agent of the searching subscriber outputs information regarding a plurality of contacts found in the first group. The subscriber can select one of the contacts found to whom the connection is to be set up, and one of the contacts found is preselected by the communication agent of the searching subscriber.

This refinement of the method according to the invention enables the searching subscriber to select the contact himself using the information provided about the contacts or, if appropriate, about the communications partners to whom these contacts are linked. In this context, the selection can be made either using an up key, a down key, a cursor actuation device, such as a mouse, or using a scrollwheel.

As a result of the communication agent of the searching subscriber having preselected the contact who has been found, the searching subscriber can set up the connection merely by actuating a confirmation input, that is to say without prior selection.

In one particularly beneficial embodiment of the method for setting up a connection to a contact, the information regarding the contacts found in the first group contains respective information about the type of relationship between the contact and the communications partners in the second group. In another beneficial refinement of the method according to the invention for setting up the connection to the contact, the information regarding contacts found in the first group contains respective information about the corresponding communications partners in the second group to whom the contact is linked.

The advantages of these refinements have already been described above in connection with the method for finding the contact.

In a beneficial method for finding contacts, and also in a beneficial method for setting up the connection to such the contact, a plurality of desired properties entered for the desired communications partner in the second group are logically combined, on the basis of Boolean algebra rules, in the communication agent associated with the searching subscriber. By way of example, this results in that a plurality of properties can be both ANDed and ORed, or else can be AND NOTed, etc.

The fact that a plurality of desired properties of the desired communications partner in the second group are logically combined, on the basis of Boolean algebra rules, in the communication agent associated with the searching subscriber can mean, on the one hand, that the Boolean logic combination of the properties in the communication agent of the searching subscriber is incorporated in the report to be transmitted to communication agents of members of the first group. In this case, the report containing a logic combination must be understood by the communication agents associated with the members of the first group. Since the number of reports which need to be understood by these communication agents is usually limited, only standardized search procedures, that is to say search procedures with a defined set of desired properties and defined logic combinations, are possible in this case.

However, the logic combination of a plurality of desired properties entered for the desired communications partner in the second group in the communication agent associated with the searching subscriber, on the basis of Boolean algebra rules, can also mean that the communication agent associated with the searching subscriber transmits both the entered properties and the associated logic combination provisions to the communication agents associated with the members of the first group, and that the respective logic combination of the transmitted properties on the basis of the transmitted rules of Boolean algebra is carried out in the communication agents associated with the members of the first group.

Other features which are considered as characteristic for the invention are set forth in the appended claims.

Although the invention is illustrated and described herein as embodied in a method for finding a contact or for setting up a connection to the contact, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a schematic block diagram of a communication agent associated with a searching subscriber, of communication agents associated with subscribers in a first group, and of subscribers in a second group according to the invention.

DESCRIPTION OF THE PREFERRED EMBODIMENTS

Referring now to the single FIGURE of the drawing in detail, there is shown a communication agent AG-A that is associated with a subscriber A who is searching for a contact to a communications partner having particular properties, or who wishes to set up a connection to this contact.

Two further communication agents AG-B/G1 and AG-C/G1 shown in the FIGURE are associated with subscribers B and C form a first group within which the desired contact is sought.

The schematically shown communication agents AG-A, AG-B/G1 and AG-C/G1 each contain a control unit PU, a man/machine interface MMI, a communication unit COM and a respective, specific communications partner file DB-A, DB-B and DB-C containing data records of properties of particular communications partners. Thus, the communication agent AG-A contains data records B-DATA, C-DATA, D-DATA, E-DATA, F-DATA and G-DATA containing properties of subscribers B, C, D, E, F and G (not shown implicitly). The communication agent AG-B/G1 contains data records A-DATA, C-DATA, D-DATA, H-DATA, J-DATA and K-DATA containing properties of subscribers A, C, D, H, J and K (not shown implicitly). The communication agent AG-C/G1 contains data records A-DATA, B-DATA, D-DATA, K-DATA, L-DATA and M-DATA containing properties of subscribers A, B, D, K, L and M (not shown implicitly).

The individual communication agents AG-A, AG-B/G1 and AG-C/G1 can each communicate with one another using their communication units COM and a communication network (not shown). By way of example, such a communication network can be a data network, also called a LAN or WAN. In addition, such a communication network can be an Internet protocol network, a mobile radio network or a hard-wired integrated services digital network (ISDN).

The FIGURE also shows a schematic illustration of subscribers J, N, P, R and S, which together form a second group. The subscribers in the second group have properties which subscriber A, with whom the communication agent AG-A is associated, expects of the communications partner. These desired properties ought to be contained in the data records J-DATA of the communication agents AG-B/G1 and AG-C/G1 if subscriber B or C, with whom the communication agent AG-B/G1 or AG-C/G1 is associated, maintains contact with the sought communications partner. Such a subscriber B, C in the first group would then be a sought contact to whom subscriber A wishes to set up a connection.

The number of members of the first group and the number of members of the second group G2 are naturally not restricted to two and five, respectively.

In a first illustrative embodiment, it is assumed that the communication agents AG-A, AG-B/G1 and AG-C/G1 are configured to understand and execute search requests in which properties of communications partners are logically combined using Boolean operators such as AND, OR and NOT. In addition, the data records A-DATA, C-DATA, D-DATA, H-DATA, J-DATA, K-DATA, L-DATA and M-DATA contain information regarding the communications partner properties NAME, COMPANY, BUSINESS AREA, FUNCTION, KNOWLEDGE and CONTACT DATE.

The subscriber A would like to contact a communications partner in a company X who has knowledge regarding a product Y. However, he prefers first to contact an employee in his own company who already has contact with company X.

Subscriber A, who wants to set up a connection to a contact, defines—for this example, as a subscriber in the first group, in which he is hoping for this contact—all the employees in his own company who work in his business area. If subscriber A works in the mobile radio business area in Siemens AG, he therefore enters the following into his associated communication agent AG-A using the man/machine interface MMI, e.g. a keyboard, as the properties for members of group 1:

COMPANY=Siemens AG AND BUSINESS AREA= mobile radio.

As the properties of the desired communications partner in the second group, subscriber A can enter the following into his associated communication agent AG-A, for example:

Company=X.

According to the FIGURE, subscribers J, N, P, R and S therefore have this property of being employed in the company X.

If subscriber A-now uses the man/machine interface MMI to issue his associated communication agent AG-A with the command to set up a connection to a member of the first group who is in contact with a member of the second group, the communication agent AG-A uses its communication unit COM to transmit an appropriate request to the communication agents AG-B/G1 and AG-C/G1 for the subscribers in the first group. The communication agents AG-B/G1 and AG-C/G1 receive the request via their communication units COM, and their control units PU each promptly checks the communications partner file DB-B or DB-C for entries of communications partners in the second group having the desired properties Company=X.

If such an entry is present, in this case J-DATA in the communications partner file DB-B, the communication agent AG-B/G1 transmits information regarding subscriber B found as a contact in the first group, with whom the communication agent is associated, to the communication agent AG-A for the searching subscriber A using the communication unit COM and a network (not shown).

If such an entry is not present, the respective control unit PU in the communication agent AG-B/G1, AG-C/G1 would be able to dispense with a report to the communication agent AG-A. In this case, the control unit PU in the communication agent AG-A would prompt a display on the man/machine interface MMI after a particular time has elapsed, in order to show that no contact has been found. In the example described, however, it is assumed that, if there is no match, the control unit PU in each communication agent AG-B/G1, AG-C/G1 for the subscribers in the first group transmits this absent match between sought properties of subscribers in the second group G2 and stored properties of communications partners to the communication agent AG-A for the searching subscriber A.

The control unit PU in the communication agent AG-A for the searching subscriber A outputs information regarding the contact B found in the first group to the man/machine interface MMI of the communication agent AG-A. In addition, a connection is set up. If information from more than one contact in the first group is transmitted to the communication agent AG-A for the searching subscriber A, subscriber A can be requested to select a contact to whom a connection is to be set up. Alternatively, the control unit PU in the communication agent AG-A can make a selection itself. Thus, for example, a connection could be set up with the first contact reported.

In the case described, all the possible contacts in the first group who have an entry in their communications partner file DB-B, DB-C for a communications partner in the company X who has been made available for the search are reported to the communication agent AG-A. The communications partners in the company X do not necessarily have to be able to provide information about the product Y. A somewhat higher hit reliability could be attained by entering the following desired properties for the members of the second group G2:

COMPANY=X AND (FUNCTION=sales OR FUNCTION=marketing).

If this query also yields a plurality of possible contacts within the first group, subscriber A could also enter the following desired properties for members of the second group G2:

COMPANY=X AND KNOWLEDGE=product Y.

If the searching subscriber A is preferably searching for contacts who recently had contact with employees of the company X, a property to be entered for the members of the second group G2 may be:

COMPANY=X AND CONTACT DATE>Dec. 1, 1998.

The information transmitted to the communication agent AG-A, and output by the latter, regarding the contact from the first group preferably also contains information about the communications partner from the second group G2.

In a second illustrative embodiment, it is assumed that the communication agents AG-A, AG-B/G1 and AG-C/G1 are configured to understand and execute search requests in which properties of the communications partners are logically combined using Boolean operators such as AND, OR and NOT. In addition, the data records A-DATA, C-DATA, D-DATA, H-DATA, J-DATA, K-DATA, L-DATA and M-DATA contain information regarding the communications partner properties NAME, COMPANY, BUSINESS AREA, FUNCTION and COMMUNICATION TYPE.

In this second example, the subscriber A, with which the communication agent AG-A is associated, would like to know which of his colleagues uses the new Internet telephony type of communication for external business contacts and can consequently provide information about the reliability and quality of this type of communication.

In a similar manner to the example above, the subscriber A asks the communication agent AG-A to provide him with the names of contacts within his own company who had external connections using the Internet telephony type of communication. An example of the properties of the members of the first group entered on the communication agent AG-A using the man/machine interface MMI is:

COMPANY=Siemens AG.

In this case, the properties of the second group could be:

COMPANY NOT Siemens AG AND COMMUNICATION TYPE=Internet telephony

Such a search yields, in the manner described above, the contacts within the company of the subscriber who have set up a connection to at least one external communications partner using Internet telephony. In this regard, the communication agents AG-B/G1 associated with these contacts transmit information regarding these contacts to the communication agent AG-A. The control unit PU in the communication agent AG-A prompts output of this information via the man/machine interface MMI in the communication agent AG-A. The subscriber A can then select a contact for setting up a connection.

The subscriber A can ascertain the members of the first group by interrogating his own communications partner file or a general company communications partner file, for example.

We claim:

1. A contact finding method, which comprises:

providing a first group and a second group;

entering desired properties of a desired communications partner of the second group into a communication agent associated with a searching subscriber, the desired properties including information about at least one of reliability and quality of communication;

transmitting inquires specifying the desired properties from the communication agent associated with the searching subscriber to a multiplicity of further communication agents each associated with persons within the first group;

checking a communications partner file of each of the persons in the first group for entries of communications partners in the second group having the desired properties via the further communication agents associated with the persons;

transmitting information regarding a found subscriber in the first group, who has been determined to be a contact and with whom one of the further communication agents is associated, by the further communication agents to the communication agent of the searching subscriber if the desired communications partner having the desired properties is found;

outputting additional information, via the communication agent of the searching subscriber, regarding the contact found in the first group to a man/machine interface; and selecting the contact found in the first group in order to initiate a connection by providing the at least one of reliability and quality of communications.

2. The method according to claim 1, which comprises outputting further information, via the communication agent of the searching subscriber, regarding a plurality of contacts found in the first group.

3. The method according to claim 2, which comprises providing the further information regarding the plurality of contacts found in the first group with respective information pertaining to a type of relationship between the contact and the communications partners in the second group.

4. The method according to claim 2, which comprises providing the further information regarding the plurality of contacts found in the first group to contain respective information about the communications partners in the second group to whom the contact is linked.

5. A connection set up method, which comprises:

providing a first group and a second group;

entering desired properties of a desired communications partner of the second group into a communication agent associated with a searching subscriber, the desired properties including information about at least one of reliability and quality;

making a request for the connection to be set up to a contact within the first group;

transmitting inquiries specifying the desired properties, via the communication agent associated with the searching subscriber, to a multiplicity of further communication agents each associated with persons within the first group;

checking, via the further communication agents, a communications partner file of each of the persons in the first group for entries of communications partners in the second group having the desired properties, and checking the contact found in the first group by providing the at least one of the desired reliability and quality of communication;

transmitting information regarding a found subscriber in the first group who has been found as the contact and with whom one of the further communication agents is associated, by the further communication agents to the communication agent of the searching subscriber if the desired communications partner having the desired properties is found; and using the communication agent of the searching subscriber to output additional information regarding the contact found in the first group and set up the connection to the contact by providing the at least one of the desired reliability and quality of communication.

6. The method according to claim 5, which comprises using the communication agent of the searching subscriber to output the additional information regarding the contact found in the first group using graphic characters on a display unit, and setting up the connection after confirmation has been entered by the searching subscriber.

7. The method according to claim 6, which comprises using the communication agent of the searching subscriber to output further information regarding a plurality of contacts found in the first group, in which the searching subscriber can select one of the contacts found to whom a connection is to be set up, and in which one of the contacts found is preselected by the communication agent of the searching subscriber.

8. The method according to claim 7, which comprises providing the further information regarding the plurality of contacts found in the first group to contain respective information about a type of relationship between the contact and the communications partners in the second group.

9. The method according to claim 7, which comprises providing the further information regarding the plurality of contacts found in the first group to contain respective information about the communications partners in the second group to whom the contact is linked.

10. The method according to claim 5, which comprises logically combining on a basis of Boolean algebra rules a plurality of the desired properties entered for the desired communications partner in the second group.

* * * * *